US012228306B2

(12) United States Patent
Guasti

(10) Patent No.: US 12,228,306 B2
(45) Date of Patent: Feb. 18, 2025

(54) AIR DIFFUSION DEVICE

(71) Applicant: ZEFFIRO S.R.L., Barberino di Mugello (IT)

(72) Inventor: Gino Guasti, Barberino di Mugello (IT)

(73) Assignee: GEORGE TFE SCP, Monaco (MC)

( * ) Notice: Subject to any disclaimer, the term of this patent is extended or adjusted under 35 U.S.C. 154(b) by 497 days.

(21) Appl. No.: 17/624,349

(22) PCT Filed: Jun. 26, 2020

(86) PCT No.: PCT/IB2020/056070
§ 371 (c)(1),
(2) Date: Jan. 2, 2022

(87) PCT Pub. No.: WO2021/001736
PCT Pub. Date: Jan. 7, 2021

(65) Prior Publication Data
US 2022/0357071 A1   Nov. 10, 2022

(30) Foreign Application Priority Data

Jul. 4, 2019   (IT) .......................... 102019000010836

(51) Int. Cl.
*F24F 13/075*   (2006.01)
*F24F 13/28*   (2006.01)

(52) U.S. Cl.
CPC ............ *F24F 13/075* (2013.01); *F24F 13/28* (2013.01); *F24F 2221/36* (2013.01)

(58) Field of Classification Search
CPC .......... F24F 13/075; F24F 13/28; F24F 13/06; F24F 2221/36; B01D 2279/50;
(Continued)

(56) References Cited

U.S. PATENT DOCUMENTS 6,135,878 A    10/2000 Felsen
6,257,976 B1    7/2001 Richardson, III
(Continued)

FOREIGN PATENT DOCUMENTS

GB          849591 A    9/1960
KR       101195218 B1   10/2012
KR       101446464 B1 * 10/2014  ............... B60H 1/34

OTHER PUBLICATIONS

International Search Report for corresponding application PCT/IB2020/056070 filed on Jun. 26, 2020.
(Continued)

*Primary Examiner* — Steven B McAllister
*Assistant Examiner* — Charles R Brawner
(74) *Attorney, Agent, or Firm* — Jason Lee DeFrancesco

(57) ABSTRACT

Air diffusion terminal apparatus (1) for wall or ceiling (33), fluidly connectable to an air ventilation system (3), comprising: a frame (4) comprising a framework (8,9) and a through-hole (35), the framework (8,9) being configured to be installed and housed in a cavity of the wall/ceiling (33); a cartridge (5) configured to be insertable in the frame (4) according to a first direction (F) parallel to a longitudinal axis (L) of the through-hole (35) so to fill the through-hole (35) of the frame (4); said cartridge (5) comprising a plurality of housings (6) for receiving respective modules (7), said modules (7) comprising at least an air diffusion module in turn comprising deflecting blades (7A,7B,7C) or a plate (7D) provided with holes (7E) or nozzles (7F).

15 Claims, 3 Drawing Sheets

(58) Field of Classification Search
CPC ............ B01D 46/0006; B01D 46/0013; B01D 46/0043; B01D 46/0049
USPC ........................................................ 454/314
See application file for complete search history.

(56) References Cited

U.S. PATENT DOCUMENTS

| | | | |
|---|---|---|---|
| 10,866,008 B1* | 12/2020 | Notarianni | F24F 13/084 |
| 2002/0022450 A1* | 2/2002 | Berger | F24F 13/0272 |
| | | | 454/290 |
| 2005/0284113 A1 | 12/2005 | Jang et al. | |
| 2007/0167127 A1* | 7/2007 | Wiley | F24F 13/0236 |
| | | | 454/229 |
| 2017/0128613 A1* | 5/2017 | Stewart | A61L 9/20 |
| 2017/0314812 A1* | 11/2017 | Hurley | B01D 46/0005 |
| 2019/0160408 A1 | 5/2019 | Huang et al. | |

OTHER PUBLICATIONS

Written Opinion of the International Searching Authority for corresponding application PCT/IB2020/056070 filed on Jun. 26, 2020.

* cited by examiner

AIR DIFFUSION DEVICE

TECHNICAL FIELD

The present invention relates to the field of air diffusion systems for civil and industrial buildings, in particular air distribution terminals for air centralized systems, even more particularly recessed air diffusers for walls and ceilings.

BACKGROUND ART

The state of the art includes various known solutions for directing the airflow of a centralized air conditioning or heating system to the prospecting or underlying environment.

An example of prior art is provided by document U.S. Pat. No. 6,030,427A in which a diffuser terminal for ventilation ducts is described comprising a frame fixed to a wall and hinged to a folding element, which comprises a first order of vertical fins, a second order of horizontal fins, both fixed and immovable, and a filter module that can be replaced by extraction from said folding element. Said system does not allow to modify the portion related to the fins, and it does not suggest to add further modules which allow a personalization of the terminal.

Another example of diffuser for ventilation ducts is provided by document U.S. Pat. No. 6,241,794 which, in a similar way, provides an element removable from the wall integrally with its frame, in which said removable element comprises an immovable fin and a removable filter. Like the previous solution, the diffuser cannot be customized or modified according to the user's needs and also does not minimize its aesthetic impact, since the frame of the air diffuser is clearly visible when it is inserted into the wall or ceiling.

A further example of diffuser terminal for ventilation ducts is provided by document US20090075582A1 which describes the possibility of having a semi-frame fixed to the wall and hinged to a further semi-frame that can be opened with respect to the first one. Inside the openable frame, a system can be positioned to condition, control or limit the flow of air and a filter.

This document does not describe a specific embodiment and does not indicate that the filtering or diffusion elements can be extracted or modified. On the contrary, it discloses a system in which, inside the openable frame, one module can be positioned rather than another. This implies that the module described therein is not adaptable or modifiable, but simply replaceable.

Finally, it's known the document U.S. Pat. No. 9,765,988B2, which relates to a grate that can be positioned on a wall or ceiling, configured to prevent the view of the frame of the grate itself, improving its aesthetic appearance. This solution does not allow the extraction of the grate from the wall once it is fixed to it.

It is also known that document KR101195218 discloses a solution in which a plurality of filters can be inserted in a filter magazine, which in turn can be inserted in a frame which can be hung on a wall.

Lastly, it's known the document US2019/160408 in which a plurality of filters are insertable in a support element.

The prior art available therefore does not provide a solution that allows the user to adapt a diffusion apparatus according to seasonal or construction requirements. Specifically, a diffusion system that now works for delivering air and in later for drawing air from an environment, thus adaptable to the new function, does not exist in the state of the art. A system that allows an easy, economic and rapid adaptability of the diffuser to similar needs is also absent.

Furthermore, it's not available a diffusion apparatus that allows to minimize its aesthetic impact and to improve its visual perception, safeguarding adaptability and flexibility.

Finally, there is no an air diffusion apparatus able to provide advanced functions such sanitization or the possibility to understand if the air is delivered by the apparatus and at what temperature.

SUMMARY

The aforementioned drawbacks of the prior arts are now solved by an air diffusion terminal apparatus for walls or ceilings. The diffusion terminal apparatus or diffuser or diffusion grille is fluidly connectable to an air ventilation system, for example an air conditioning or central heating system. Said air diffusion apparatus comprises a frame comprising a framework and a through hole. The framework is configured and shaped so to be installable and accommodable in a cavity of the wall or ceiling. Said air diffusion apparatus also includes a cartridge configured to be insertable in the frame according to a direction parallel to the longitudinal axis of the through hole in order to fill the through-hole of the frame. When the cartridge is inserted into the through hole of the frame, only the front of the cartridge is visible. The cartridge comprises a plurality of housings for receiving respective modules. Said modules can be inserted and removed in the cartridge according to directions orthogonal to said first direction. Said modules comprise at least one air diffusion module in turn comprising deflector blades or a plate equipped with holes or nozzles.

This solution allows to make customizable the air diffusion terminal, transforming it in a very short time into a suction or discharge device according to user requirements. For example, a diffuser installed in an environment with the suction function can be easily transformed in a delivery diffuser if the purpose of the environment is changed or if the air ventilation system is modified.

This solution also allows to quickly and easily customize the diffuser according to the needs of the user. This solution is therefore cheaper than the known ones since it is sufficient to purchase the frame and the cartridge, obtaining only the modules that the user effectively needs. Any extra modules can also be added at a later time. For example, the user can initially choose to have a diffuser with only horizontal blades and subsequently decide to also add vertical blades, thus saving this expense at first. In addition, thanks to this solution, the user can customize the appearance of the ventilation nozzle according to his tastes.

Furthermore, this solution allows to not completely remove the apparatus from the wall/ceiling in order to customize it. In fact, since the frame remains attached to the wall/ceiling, the removal and customization of the cartridge is particularly quick and simple.

Advantageously, said deflecting blades are horizontal, vertical or oblique blades and can be fixed or individually or collectively adjustable. Even the nozzles can be fixed or adjustable. This allows to direct the airflow, for example a delivery airflow, coming out from the diffuser.

In particular, the framework of the frame can comprise a base and a flange extending outwardly from the base. This flange can work as anchoring element of the diffuser to the wall or ceiling for avoiding its extraction. The flange can be arranged on the base so that when the flange is clamped between a substrate of the wall or ceiling, for example the bricks that compose it, and a finishing layer stacked on said substrate, for example a plaster or a finishing plate made of wood or stone, a frontal edge of the framework of the frame and an external side of the finishing layer are substantially coplanar. This solution allows to minimize the aesthetic impact of the apparatus which in this way does not seem to have a frame, since it is almost completely hidden in the wall or ceiling. This creates a great aesthetic advantage for the solution. Alternatively, the flange is arranged on the base so as to be visible when the flange is firmly anchored to the wall or ceiling.

Alternatively, the framework of the frame comprises clamps, i.e. elastic harpooning elements, which protrude laterally to anchor the framework of the frame to a substrate of the wall/ceiling in a reversible manner.

In a particular version, the framework of the frame comprises on an inner side at least one track or rail configured to cooperate with a corresponding at least one rail or track of the cartridge. These track and rail allow an easy insertion of the cartridge in the framework of the frame. Advantageously, said track and rail of the frame's framework and of the cartridge are substantially complementary and arranged in an offset manner with respect to a longitudinal median plane of the apparatus, so to allow only a sense of insertion of the cartridge in the framework of the frame.

Preferably, the apparatus can comprise stopping means for releasably anchoring the cartridge to the framework of the frame avoiding a leakage of the cartridge from the framework of the frame. Still more preferably, said stop means are configured to keep the cartridge in the frame of the frame until a pulling force exerted on the cartridge exceeds a predetermined threshold. In this way, the extraction of the cartridge can only takes place if a certain force is applied from the outside and the weight of the module alone or the thrust of the air on the module are not able to push out the cartridge from the framework of the frame.

Preferably, at least one of the modules of said air diffusion terminal is a filter, to allow the filtering of the air flowed through the diffuser, when it acts as delivery terminal.

In a particular embodiment of the apparatus, the framework of the frame comprises electrical contacts electrically connected to a power source or to an electrical circuit of said air ventilation system. The cartridge comprises corresponding electric contacts arranged so to establish an electrical connection with said electrical contacts of the framework of the frame when the cartridge is housed in the framework of the frame. In this way, the cartridge can have an electrical supply that allows to have electrically operable modules.

Preferably, at least one of said modules can comprise one or more of the following electrical apparatuses:
 a lamp;
 horizontal or vertical motorized blades;
 a germicidal lamp;
 a pressure sensor;
 a temperature sensor.
Said electrical apparatuses are electrically connectable with the cartridge by means of electric connection means, for example said electric connection means can be of socket-plug type.

Said modules comprising electrical devices allow to make the air diffusion apparatus active. In particular, the lamp allows to illuminate the space behind the diffusion blades with a classic light or with a colored light. In particular, the module can comprise motorized horizontal or vertical blades. This type of module allows to remotely change the angle of the horizontal and/or vertical blades, for example via a remote control or an electronic actuator. Said electrical apparatus can be a germicidal lamp that allows the total or partial elimination of any germs or bacteria present on the apparatus due to the humidity of the air that passes through it. In particular, the germicidal lamp can be a lamp configured to generate UV-C type ultraviolet light.

In particular, said colored lamp can be configured to emit a blue or azure light when the air ventilation system flows refrigerated air and to emit a red or orange light when the air ventilation system flows hot air. In this way, the colored light emitted by the lamp allows you to understand if hot or cold air is coming out of the air conditioning/heating system, without having the need to place a hand in front of the diffuser as traditionally occurs.

Advantageously, the cartridge of said diffuser comprises a cartridge frame having an outer lateral surface substantially complementary to an internal surface of the framework of the frame, to allow a better air seal around the lateral edges of the cartridge and to minimize mechanical slacks between the two elements that can cause vibrations and noises. Said outer lateral surface can comprise a plurality of openings, one for each housing. Through these openings the removable modules can be inserted/extracted in the housings. Preferably, said openings are all arranged on one side of said outer lateral surface, to simplify the positioning of the modules. More preferably, said openings are on the upper side of said outer lateral surface, to avoid that when said cartridge is extracted from a wall said modules can fall by gravity downwards.

To prevent the modules from leaking out from the cartridge, it is also possible that the cartridge frame includes locking means which engage once the module is inserted into the cartridge frame. These removable modules are configured to match the cartridge housings to minimize air leakage between the cartridge and modules and to avoid vibrations due to the mechanical clearances between modules and the cartridge housings.

To control the device when it is equipped with electrical equipment, the same can comprise a remote control interface comprising a control unit and a human-machine interface. This control unit can be configured to receive a selection signal from the human-machine interface and elaborate it to generate a command signal of the electrical apparatuses of the air diffusion apparatus.

These and other advantages will become clearer from the description, given below, of an example of embodiment given by way of non-limiting example with reference to the attached drawings.

DESCRIPTION DRAWINGS

DETAILED DESCRIPTION

Figure 1:
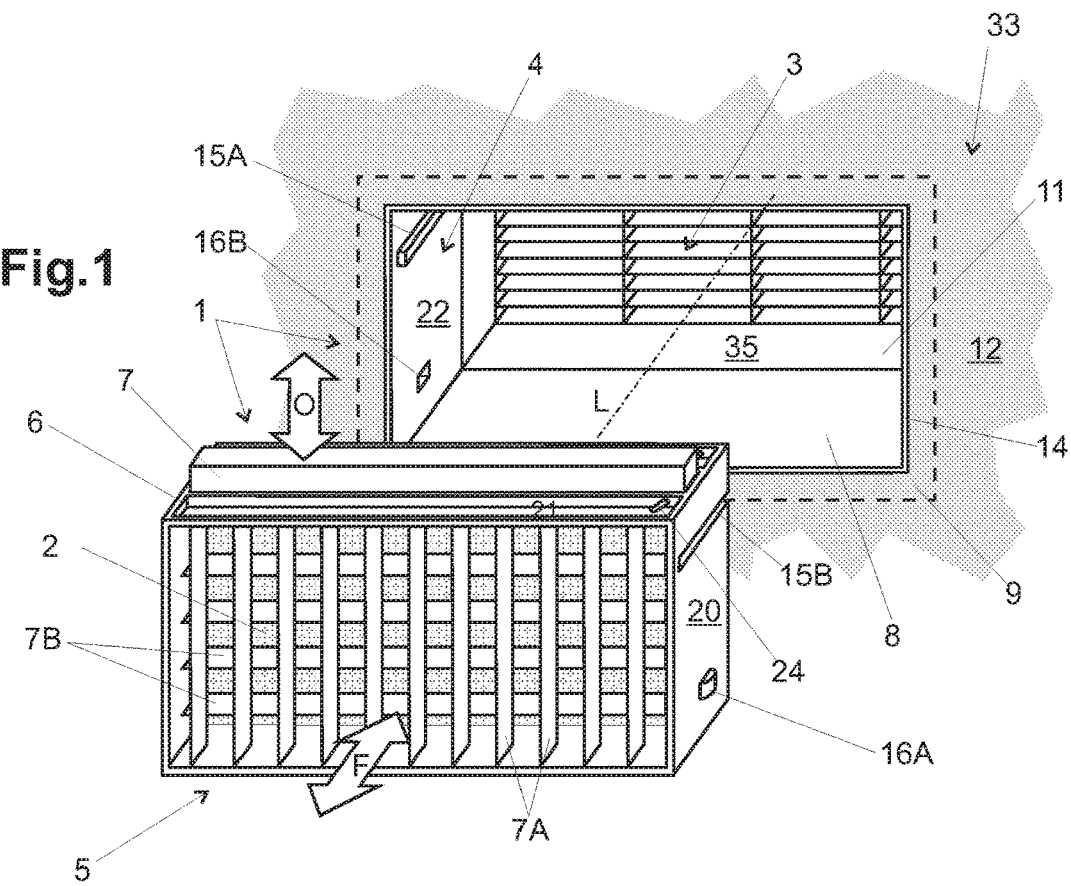
FIG. 1 shows an axonometric view of a first embodiment of the air diffusion apparatus according to the present invention and the related wall and air ventilation system to which it is connected.

The following description of one or more embodiments of the invention refers to the attached drawings. The same numerical references in the drawings identify the same or similar elements. The object of the invention is defined by the attached claims. The technical details, structures or characteristics of the solutions described below can be combined with each other in any way.

With reference to FIGS. 1-5, a diffusion apparatus 1, also called diffuser, is shown and comprises a cartridge 5 and a frame 4, in turn comprising a framework 8,9 and a through-hole 35 inside it. The framework 8,9 is shaped so as to be partly housed in a cavity (hole) of the wall or ceiling 33.

In particular, in FIG. 1 the cartridge 5 is shown detached from the frame 4, to represent the extraction or insertion phase in a wall or ceiling 33. The cartridge 5 can be inserted or extracted with respect to the frame 4 along a direction F parallel to the longitudinal axis L of the through-hole 35 of the frame 4 itself.

In FIG. 1, through the opening of the wall or ceiling 33, it is possible to see in the background a ventilation system 3 comprising a ventilation duct 11.

Figure 3:
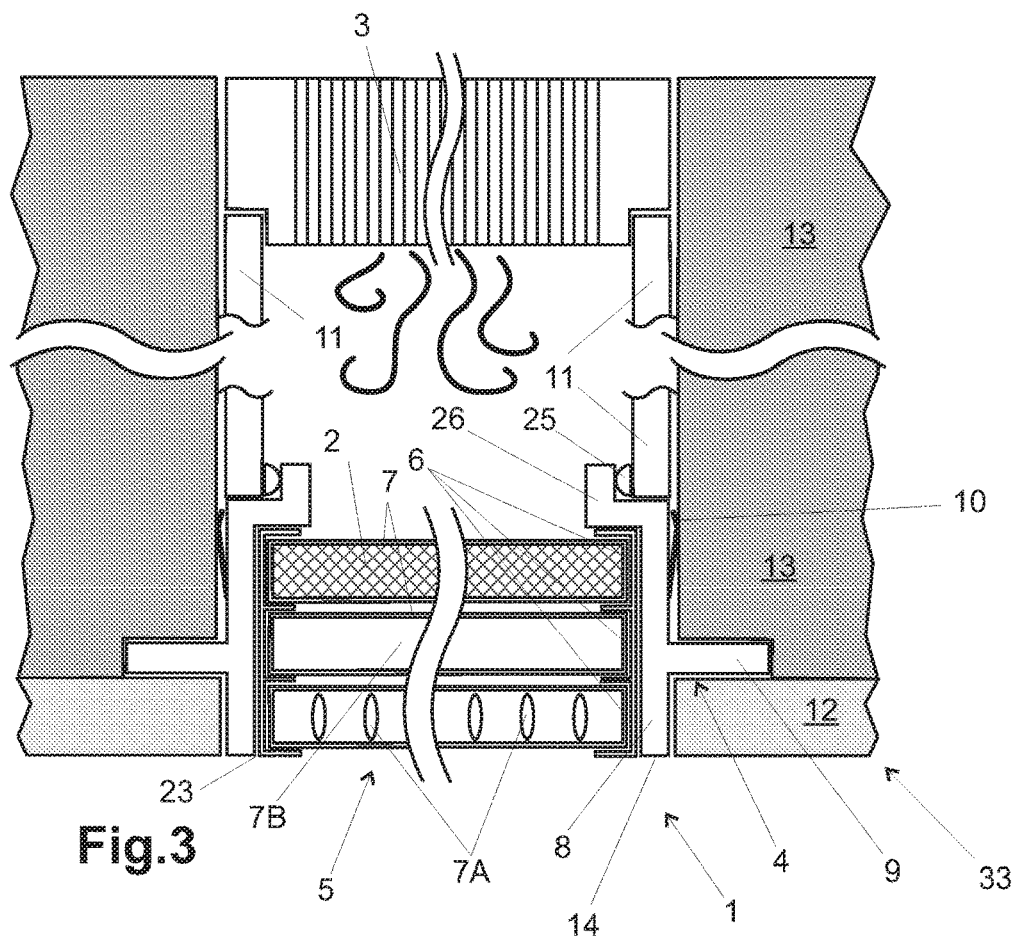
FIG. 3 shows a section view of said first embodiment of the air diffusion apparatus when it is connected to the ceiling and fluidly connected to an air ventilation system, to which it is connected.

Said conduit 11 is connected by means of seals 25, visible in FIG. 3, to the framework of the frame 4 of the apparatus 1. In this way, the air blown or drawn in by the ventilation system 3 passes through the apparatus 1. The air blown by the ventilation system 3 flows towards the frame 4 and in particular through its through hole 35. When the through-hole 35 is filled by the cartridge 5, said air passes through the cartridge 5 and its modules 7.

Said framework of the frame 4 comprises a flange 9 for being rigidly anchored to the wall 33. Said flange 9 is represented in FIG. 1 with a dotted line since it is covered by a finishing layer 12. As better illustrated in FIG. 3, the flange 9 of the framework of the frame 4 can be clamped between a substrate 13 of the wall (or ceiling) and a finishing layer 12 overlapping to the same.

The flange 9 also has fixing holes (not shown) for blocking the frame 4 to the wall or ceiling 33.

The finishing layer 12 can be plaster or a finishing panel, for example made of wood or stone, attached to the substrate 13.

Figure 2:
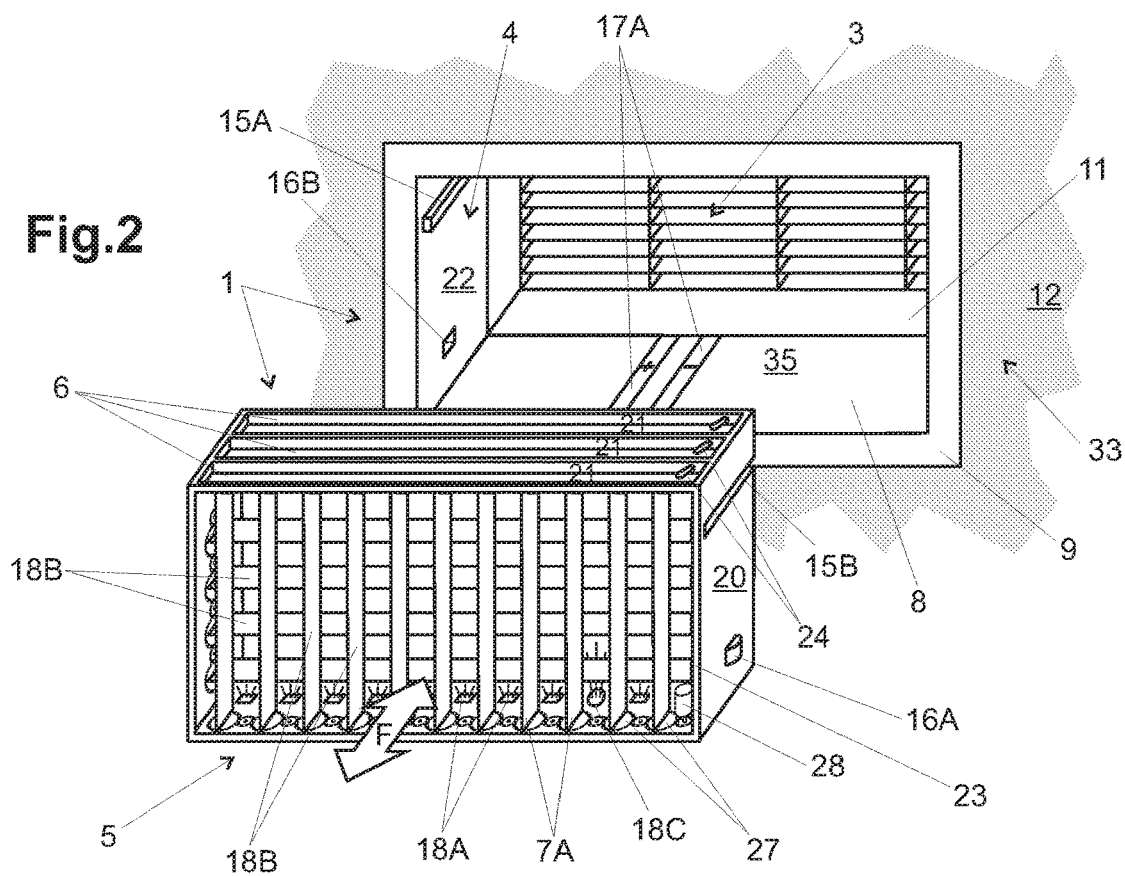
FIG. 2 shows an axonometric view of a second embodiment of the air diffusion apparatus according to the present invention and the related wall and air ventilation system to which it is connected.
Figure 4:
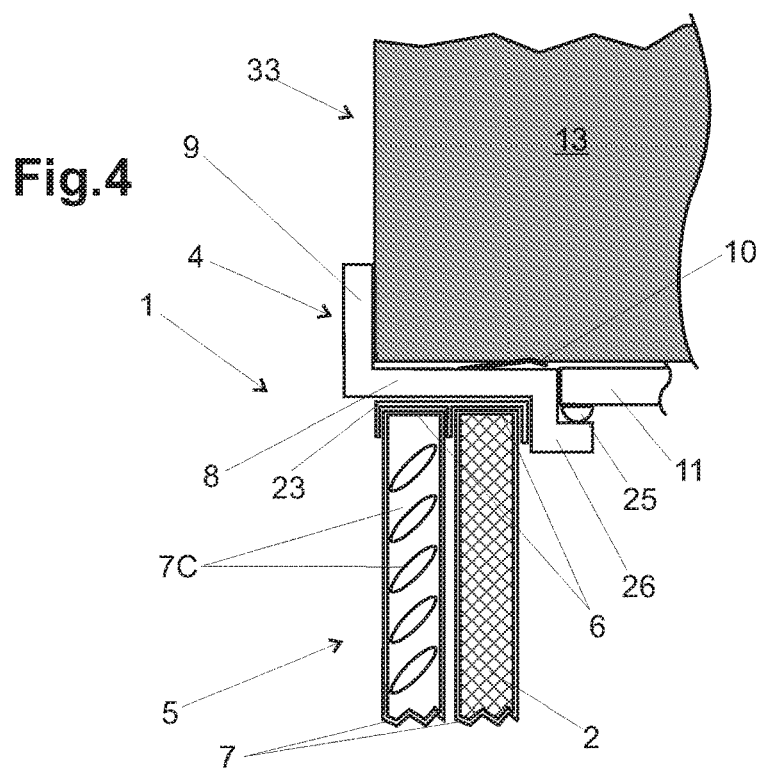
FIG. 4 shows a section view of a third embodiment of the air diffusion apparatus when it is connected to a wall and fluidly connected to an air ventilation system to which it is connected.

In an alternative version illustrated in FIGS. 2 and 4, the flange 9 can be visible, thus attached over the finishing layer 12. This happens in particular when the flange 9 has a particular aesthetic value.

The framework of the frame 4 comprises a base 8 having a parallelepiped-shape with no bases for realizing said through-hole 35. The flange 9 protrudes externally from the external side wall of the base 8. The base 8 of the framework of the frame 4 is completely inserted inside the wall or ceiling 33 so to leave visible only the flange 9.

The flange 9 can be arranged in an intermediate position of the side wall, so that the cross-section of the frame is substantially "T" shaped.

This particular arrangement of the flange 9 allows to place the finishing layer 12 over it. Once the flange 9 is joined to the substrate 13 and covered by the finishing layer 12, only the front profile 14 of the base 8 of the frame is visible, if the wall or ceiling 33 is observed frontally.

The distance between the flange 9 and said front profile 14 is a function of the thickness of the finishing layer 12 to be used. For example, if a 15 mm thick marble slab is placed on the substrate 13 of a wall 33, the distance between the flange 9 and said front profile is 15 mm. Since the thickness of the sheet with which the framework of the frame 4 is made is few millimeters, the frame is substantially invisible if the diffuser is observed from the front.

The framework of the frame 4 can be made of metal, preferably aluminum, or of plastic material.

The framework of the frame 4 can further comprise, as illustrated in FIGS. 3 and 4, a base 8 having a rear profile 26, opposite to the front profile 14, having an "S" shaped cross section, so that the base 8 of the frame can be inserted in the ventilation channel 11. Said rear profile 26 can support a seal 25 which, once the frame 4 is inserted in the channel 11, guarantees the seal.

The base 8 of the framework of the frame 4 can further comprise clamps 10, thus flexible protruding elements, which protrude laterally to reversibly anchor the frame 4 to the substrate 13 of the wall or ceiling 33.

The framework of the frame 4 shown in FIGS. 1 and 2 comprises two rails 15A arranged on opposite sides of the frame. Said rails 15A cooperate with two tracks 15B arranged on the cartridge 5.

The tracks 15B and the rails 15A can be arranged in an offset manner with respect to a centerline plane M, as shown in FIG. 1, so that the cartridge 5 can be inserted in the framework of the frame 4 only in one direction.

The diffusion apparatus 1 illustrated in FIGS. 1 and 2 comprises blocking means 16 configured to reversibly anchor the cartridge 5 to the framework of the frame 4. Said stopping means 16, as illustrated in FIG. 1, can comprise cushioned rollers 16A connected to the cartridge 5 and grooves 16B formed in the framework of the frame 4. The rollers 16A are pushed by elastic elements (not shown) towards the outside of the cartridge 5, so to retract when the cartridge 5 is inserted into the frame 4 and to exit when the cartridge 5 is completely extracted from the framework of the frame 4. Each roller 16A fits into the corresponding recess 16B. This mechanism ensures a reversible connection. Furthermore, by adjusting the preload provided by the elastic means to the rollers 16A and the diameter of the rollers themselves, it is possible to regulate the traction force necessary to extract the cartridge 5 from the frame 4. Said force is preferably at least equal to the maximum weight of the cartridge 5, so that the cartridge 5 does not come out by gravity if the apparatus is arranged on a ceiling 33.

As shown in FIG. 1, said framework of the frame 4 can further comprise electrical contacts 17A electrically connected to an energy source or to an electrical circuit of said air ventilation system 3. When the cartridge 5 is completely inserted in said framework of frame 4, said electrical contacts 17A come into contact with corresponding electrical contacts 17B of the cartridge 5 so as to establish an electrical connection. Said electrical contacts 17A, 17B can be sliding contacts or any other known type of electrical connection. Preferably, said electrical contacts 17A, 17B are powered with a low voltage for safety reasons.

In the event that said electrical contacts 17A of the frame 4 are electrically connected to an electrical circuit of the air ventilation system 3, it is possible to have at least one further electrical contact to allow the transmission of an electrical command signal from the ventilation system 3 to the cartridge 5. Said command signal can be used to activate, deactivate, modify or regulate said electrical apparatuses 18 as better described below.

The apparatus 1 as illustrated in FIGS. 1-5 comprises a plurality of modules 7 housed inside appropriate housings of the cartridge 5.

Said modules 7 can be active or passive, depending on whether they are electrically operable or not.

Figure 5:
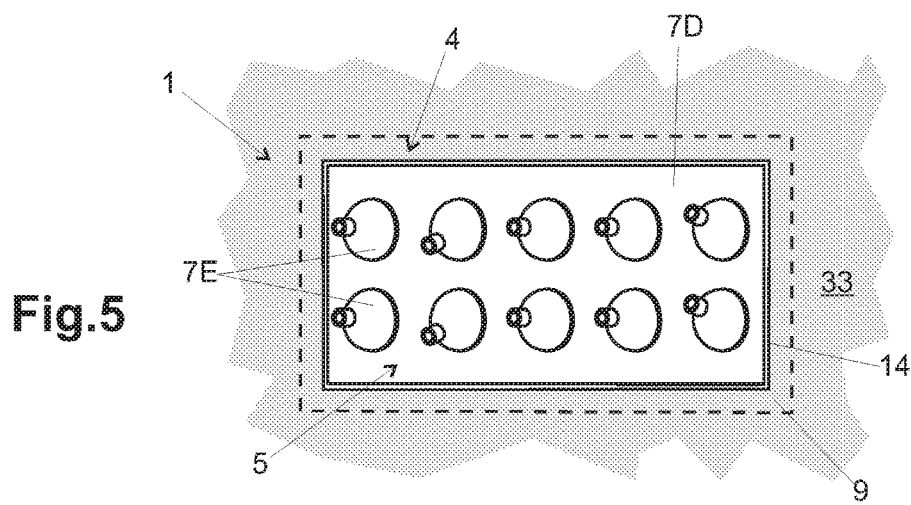
FIG. 5 shows a front view of a fourth embodiment of the air diffusion apparatus when it is connected to a wall or ceiling and fluidly connected to an air ventilation system to which it is connected.
Figure 6:
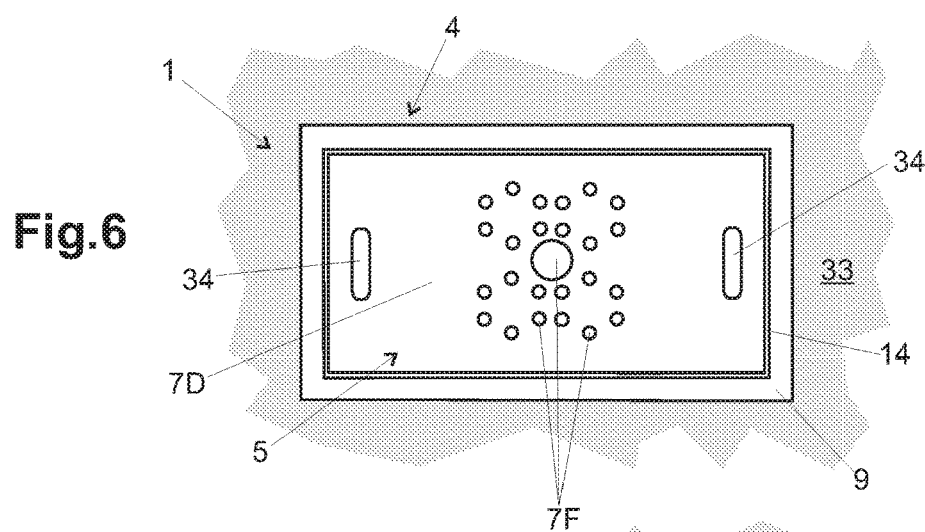
FIG. 6 shows an axonometric front view of a fifth embodiment of the air diffusion apparatus when it is connected to a wall or ceiling and fluidly connected to an air ventilation system to which it is connected.

The passive modules 7 comprise an air diffusion module which can comprise deflector blades 7A, 7B, 7C, as shown in FIGS. 1-4 and 7, or a plate 7D provided with nozzles 7E, as shown in FIG. 5, or a plate provided with holes 7F, as shown in FIG. 6.

The modules 7 can also include a filter 2, as illustrated in the embodiments of FIGS. 1, 3 and 4. The modules 7 are all configured to be inserted and extracted from the cartridge 5 according to an orthogonal direction O to the direction F, parallel to the axis L of the through-hole 35 of the frame 4. In a technically equivalent alternative version of the invention (not shown), the modules 7 are removable along the direction F, like the cartridge 5. In this version, the modules 7 are stacked on each other inside the cartridge 5 and can be inserted from the back or from the front of the same.

FIGS. 1 and 3 show a cartridge 5 in which the first outermost module comprises vertical blades 7A, the second module adjacent to the first one comprises horizontal blades 7B and the third module adjacent to the second one but not to the first one, comprises a filter 2. Said vertical and horizontal blades 7A,7B are individually orientable, thus they can rotate around an axis (not visible) that connects each blade to an armature of the module 7. Said blades can be inclined one differently from the other with a manual variation. If the blades are connected each other, for example by connecting the trailing or leading edges of the various blades with a rod, the inclination of all the blades can be changed collectively. The blades can also be configured to completely prevent the passage of air when they are aligned with each other, i.e. orthogonal to the airflow flowing in the apparatus, in this case one can also speak of a shutter.

The removable module 7 can also comprise a plate 7D equipped with nozzles 7E, as shown in FIG. 5. Said nozzles 7E are individually adjustable to direct the flow of air leaving the nozzles 7E in various directions.

In an alternative version, illustrated in FIG. 6, said module comprises a micro-perforated plate 7D with holes 7F which, like the blades 7A, 7B, 7C or the nozzles 7E, allows the passage of air through the apparatus 1, but in a different way. In particular, said micro-perforated grid 7F can be a sheet of plastic or metal material comprising a plurality of through holes arranged on the sheet according to a specific design.

As illustrated in FIG. 4, the cartridge 5 comprises only two housings 6 and in the outermost position, the first module comprises oblique blades 7C, thus inclined with respect to the vertical or horizontal position. Said oblique blades 7C are typical of air return systems, thus air intake systems. In this case, the cartridge 5, as well as the first module with the oblique blades 7C comprises a second module comprising a filter 2.

As illustrated in FIG. 2, the modules 7 can also be active, i.e. electrically operated. In this case, the modules 7 comprise one or more of the following electrical apparatuses 18:

at least one 18A lamp, preferably with white or colored LED;
horizontal or vertical blades motorized 18B;
a germicidal lamp 18C.

The cartridge 5 comprises electrical connection means 19 for electrically connecting the electrical apparatuses 18 to the cartridge 5 itself, which in turn is connected to the framework of the frame 4 by means of electrical contacts 17A, 17B.

In this way, the modules can be electrically powered and controlled together with the air ventilation system 3 or remotely.

The electrical connection means 19 for example can be sockets and plugs, respectively arranged on the modules 7 and on the cartridge 5, or vice versa, to generate an electrical connection when the module 7 is completely inserted in the cartridge 5. For example, the plug can be placed on the bottom of the housing 6 and the socket placed on the front (the insertion side) of the module 7, so that by inserting the module 7 completely in the housing 6 of the cartridge 5, said electrical connection is realized.

The LED lamp can be arranged in a specific module 7 or added to a module 7 comprising other apparatuses.

The led lamp 18A, if configured to emit white or warm light, is used to illuminate the ventilation channel 11 or to provide an indication as to whether the ventilation system 3 is working or not.

If the led lamp 18A is colored, the color provides an indication on the operation of the ventilation system 3. The led 18A is configured to emit a blue or azure light if the ventilation system 3 is emitting cold air and to emit a red or orange light if the ventilation system 3 is emitting hot air.

Optionally, the module 7 can comprise a germicidal lamp 18C, for example a lamp which produces ultraviolet light of the type UV-C. This type of lamp is effective against a large amount of viruses, bacteria and other microorganisms, which proliferate on the blades of diffuser 1 or on the ventilation system 3.

As illustrated in FIG. 2, the blades can be motorized 18B, thus operated collectively by an electric motor 28 and connected to the motor by means of gears 27 or a transmission belt. The motorization of the vertical or horizontal blades, allows to remotely regulate the air flow, by means of an electric command impulse issued for example by the control unit of the ventilation system 3. Optionally, the motorized blades 18B can act as a shutter, thus to interrupt the airflow in the apparatus when all of these blades are in a closed position.

Figure 7:
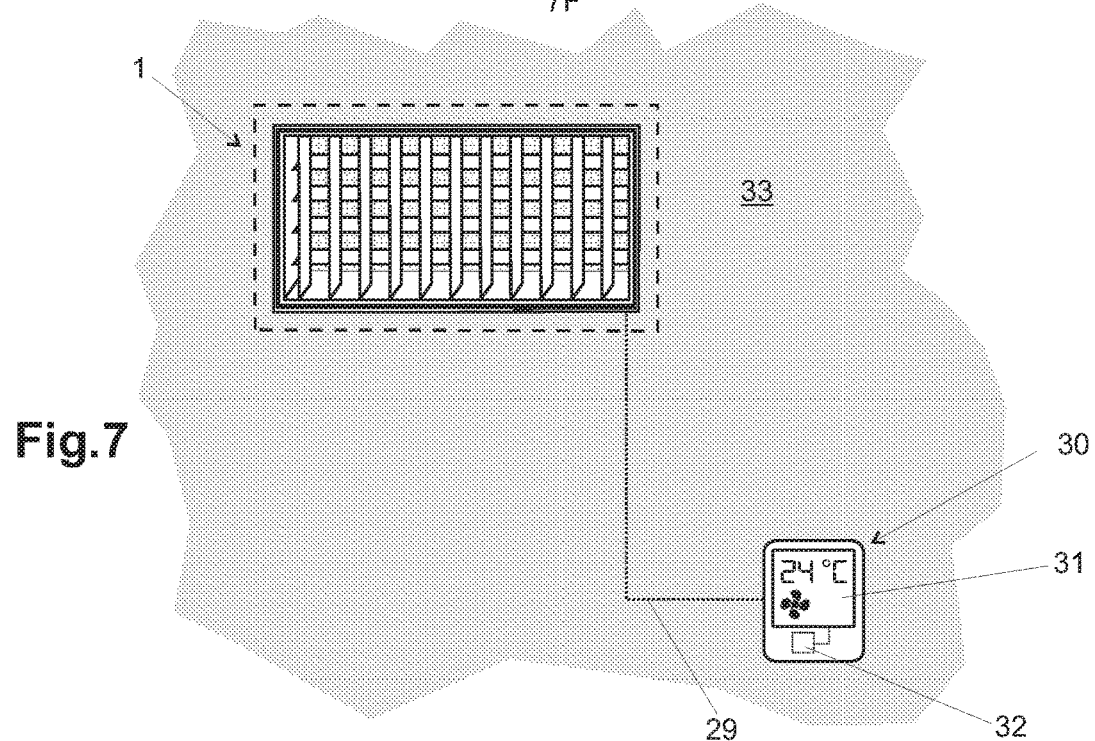
FIG. 7 shows an axonometric front view of an air diffusion apparatus according to the present invention comprising a remote control interface.

As shown in FIG. 7, said apparatus 1 can comprise a remote control interface 30, electrically connected via a connection 29 to the main body of the apparatus 1. Said remote control interface 30 comprises a control unit 32 and a human-machine interface 31, for example a touch-screen. Said control unit 32 is configured to receive a selection signal from the human-machine interface 31 and to process it in order to generate a command signal for the electrical apparatuses 18 of the air diffusion apparatus 1. Said control unit 32 can also receive signals from sensors (not shown) installed on said electrical apparatuses 18. Said sensors can be, for example, a thermometer installed on one of said modules 7 or a differential pressure sensor arranged astride the filter 2 to measure the upstream and downstream pressure of the filter 2. The control unit 32 is also configured to process the signals received by the sensors and to generate output signals to be notified to a user through said human-machine interface 31. For example, the signal received by said differential pressure sensor can be processed by said control unit 32 to generate an output signal suitable for detecting the occlusion state of the filter 2 and therefore its degree of cleanliness. By means of the control unit 32 said output signal can be communicated to the human-machine interface 31 to notify the eventual need to replace the filter. The same can occur with the signal coming from the thermometer, to communicate the temperature of the air flowing through the apparatus 1. Through the human-machine interface 31, a user can therefore interact with the apparatus 1 both to control it and to receive information on its status.

As shown in FIGS. 3 and 4, the housings of the cartridge 5 allow the modules 7 to be inserted and extracted. The peripheral edges of the housings 6 act as guides for inserting and removing the modules 7.

Said housings 6 can comprise seats realized on an inner surface of a cartridge frame 23 (FIGS. 3 and 4). Said cartridge frame 23 has an external lateral surface 20 substantially complementary to an internal surface 22 of the frame 4 (FIG. 1).

Said external lateral surface 20 comprises as many openings 21 as the housings 6 of the cartridge 5 are. In the example of FIG. 3, the housings 6 are three, while in the example of FIG. 4 the housings 6 are two. In practice, the housings 6 can be more than three, for example four or five. The housings 6 can have all the same dimensions or some of them can be larger than the others, for example having a double volume to accommodate more bulky modules.

The openings 21 are preferably all arranged on the same side of the cartridge so to load the modules 7 more comfortably.

As shown in FIG. 1, the openings 21 are all arranged on the upper side of the external lateral surface 20. This prevents the modules 7 to escape by gravity when the cartridge is extracted from the wall 33.

The modules 7 are configured to match, or to fit, with the housings 6 of the cartridge 5.

Optionally, sealing gaskets can be arranged on the modules 7 to allow an improved fluid seal between the cartridge 5 and the modules 7.

As shown in FIG. 1, the cartridge frame 23 can comprise stop means 24 to prevent the exit of the module 7 once it is inserted into the frame of the cartridge 23. The stop means 24 can be tabs provided with elastic return means, suitable to come out from the frame of the cartridge 23 and to realize an abutment for the module 7.

In order to more easily extract the cartridge 5, said cartridge frame 23 can comprise a hooking element 34, for example a retractable handle.

The apparatus 1 according to the present invention allows to customize and modulate the same according to the operational needs of the user.

The framework of the frame 4 can be constrained to the wall or ceiling 33. The cartridge 5 can be connected reversibly to the framework of the frame 4. The modules 7 can be reversibly connected to the cartridge 5.

This modularity permits to adapt the air diffusion apparatus 1 to any context of use.

The framework of the frame 4, the cartridge 5 and the removable modules 7 can have any shape, depending on the wall or ceiling 33 on which they are installed and on the air ventilation system 3 used.

Extractable modules 7 make the maintenance activities easier, since it is possible to remove the cartridge 5 from the frame 4 and subsequently the modules 7 from the cartridge 5 without specific tools.

The diffusion apparatuses 1 so conceived can also be modified according to the operational needs of the air ventilation system 3. For example, if an open space environment comprises two air diffusion apparatuses 1 according to the present invention, one for drawing and the other for delivering air, in case of a subdivision of the open space environment, both apparatuses 1 can become of the delivery type to refrigerate/heat the two rooms.

This apparatus also allows to keep the air ventilation system 3 cleaner during the installation phase, since during the installation works the cartridge can comprise a protective film installed frontally so that the ventilation ducts 11 do not get dirty with construction dust.

Optionally, the ventilation duct 11 can comprise a nebulization system of disinfectant substances to disinfect the air from viruses and bacteria in transit through the apparatus 1, or from the elements constituting the apparatus 1.

Another embodiment of the present invention is defined by the following sentence: Air diffusion system for wall or ceiling, fluidly connectable to an air ventilation system, comprising: a frame fixable to a wall or ceiling; a cartridge configured to be insertable into the frame; wherein the cartridge comprises a plurality of housings for receiving respective removable modules, each module comprises one or more of the following apparatuses: vertical blades; horizontal blades; oblique blades; a filter; nozzles; perforated grid.

Concluding, the invention so conceived is susceptible to many modifications and variations all of which fall within the scope of the inventive concept; furthermore all features can be substituted to technically equivalent alternatives. Practically, the quantities can be varied depending on the specific technical exigencies.

The invention claimed is:

1. Air diffusion terminal apparatus for wall or ceiling, fluidly connectable to an air ventilation system, comprising:
   a frame comprising a framework and a through-hole, the framework being configured to be installed and housed in a cavity of the wall or ceiling;
   a cartridge configured to be insertable in the frame according to a first direction parallel to a longitudinal axis of the through-hole so to fill the through-hole of the frame;
   said cartridge comprising a plurality of housings for receiving respective modules, said modules comprising at least an air diffusion module in turn comprising deflecting blades or a plate provided with holes or nozzles; and,
   wherein said framework of the frame has an inner side with at least one track or a rail configured to cooperate with a corresponding track or a rail disposed on the cartridge.

2. Air diffusion terminal apparatus according to claim 1, wherein said deflecting blades are selected between:
   vertical blades;
   horizontal blades;
   oblique blades; and whereby,
   said deflecting blades are fixed or individually or collectively adjustable.

3. Air diffusion terminal apparatus according to claim 1, wherein whereby said rail or track of the framework of said frame and the rail or track of said cartridge are substantially complementary and arranged in a staggered manner with respect to a longitudinal center plane of the apparatus.

4. Air diffusion terminal apparatus according to claim 1, further comprising stopping means for releasably anchoring the cartridge to the frame being configured to hold the cartridge into the framework of frame until a pulling force is exerted on the cartridge that exceeds a predetermined threshold.

5. Air diffusion terminal apparatus according to claim 1, wherein at least one module is a filter.

6. Air diffusion terminal apparatus according to claim 1, wherein the framework of the frame comprises a base and a flange extending outwardly from the base, said flange being configured to firmly anchor said framework of the frame to a wall or ceiling.

7. Air diffusion terminal apparatus according to claim 6, wherein the flange is arranged on the base so that when the flange is clamped between a substrate of the wall or ceiling and a finishing layer stacked on said substrate, a frontal edge of the frame and an external side of the finishing layer are substantially coplanar.

8. Air diffusion terminal apparatus according to claim 6, wherein the flange is arranged on the base so to be visible when the flange is firmly anchored to a wall or ceiling.

9. Air diffusion terminal apparatus according to claim 1, wherein the framework of the frame comprises laterally extending clamps that anchor the framework of the frame to a substrate of a wall or ceiling in a reversible manner.

10. Air diffusion terminal apparatus for wall or ceiling, fluidly connectable to an air ventilation system, comprising:
   a frame comprising a framework and a through-hole, the framework being configured to be installed and housed in a cavity of the wall or ceiling;
   a cartridge configured to be insertable in the frame according to a first direction parallel to a longitudinal axis of the through-hole so to fill the through-hole of the frame;
   said cartridge comprising a plurality of housings for receiving respective modules, said modules comprising at least an air diffusion module in turn comprising deflecting blades or a plate provided with holes or nozzles;
   wherein the frame comprises electric contacts electrically connected to a power source or to an electric circuit of said air ventilation system; and the cartridge comprises corresponding electric contacts arranged so to establish an electric connection with the electric contacts of the frame when the cartridge is housed in the framework of the frame.

11. Air diffusion terminal apparatus according to claim 10, wherein at least one of said modules comprises one or more of the following electric apparatuses:
   at least one lamp;
   horizontal or vertical motorized blades;
   a germicidal lamp;
   a pressure sensor;
   a temperature sensor;
   said electric apparatuses being electrically connectable with the cartridge an electric connection having plugs and sockets.

12. Air diffusion terminal apparatus according to claim 11, wherein said lamp is configured to emit a blue or azure light when the air ventilation system flows refrigerated air and to emit a red or orange light when the air ventilation system flows heated air.

13. Air diffusion terminal apparatus according to claim 11, wherein said germicidal lamp is a lamp configured to generate an ultraviolet light of UV-C type.

14. Air diffusion terminal apparatus according to claim 10, comprising a remote-control interface comprising a control unit and a human-machine interface having a control unit being configured to receive a selection signal from the human-machine interface and to elaborate it for generating a command signal of electric apparatuses of the air diffusion apparatus.

15. Air diffusion terminal apparatus for wall or ceiling, fluidly connectable to an air ventilation system, comprising:
   a frame comprising a framework and a through-hole, the framework being configured to be installed and housed in a cavity of the wall or ceiling;
   a cartridge configured to be insertable in the frame according to a first direction parallel to a longitudinal axis of the through-hole so to fill the through-hole of the frame;
said cartridge comprising a plurality of housings for receiving respective modules, said modules comprising at least an air diffusion module in turn comprising deflecting blades or a plate provided with holes or nozzles;
   wherein said cartridge comprises a cartridge frame having an outer lateral surface substantially complementary to an inner surface of the framework of frame, said outer lateral surface comprising a plurality of openings for each of said housings.

* * * * *